United States Patent [19]

Gray

[11] Patent Number: 5,164,940
[45] Date of Patent: Nov. 17, 1992

[54] MODULAR COMMUNICATION SYSTEM WITH ALLOCATABLE BANDWIDTH

[75] Inventor: Thomas Gray, Kanata, Canada

[73] Assignee: Mitel Corporation, Ontario, Canada

[21] Appl. No.: 708,769

[22] Filed: May 31, 1991

[51] Int. Cl.$^5$ ............................................. H04J 3/22
[52] U.S. Cl. ........................................ 370/84; 370/59; 370/91
[58] Field of Search ............... 370/58.2, 59, 91, 84

[56] References Cited

U.S. PATENT DOCUMENTS

| | | | |
|---|---|---|---|
| 3,814,860 | 6/1974 | Pringle | 370/84 |
| 3,982,077 | 9/1976 | Clark et al. | 370/84 |
| 4,759,017 | 7/1988 | Allan et al. | 370/84 |
| 4,788,679 | 11/1988 | Kataoka et al. | 370/60 |
| 4,979,166 | 12/1990 | Yamada | 370/84 |

Primary Examiner—Douglas W. Olms
Assistant Examiner—Russell W. Blum
Attorney, Agent, or Firm—Evenson, Wands, Edwards, Lenahan & McKeown

[57] ABSTRACT

A digital communication system comprising a plurality of lines some of which carry data at various data rates, apparatus for detecting the rates and for determining the destination lines to which the data are to be passed, receivers associated with the lines, memory apparatus for receiving and temporarily storing the data as it arrives on the lines carrying data, an internal bus operating at a predetermined data rate at least as high as a maximum one of the various data rates, apparatus for enabling each the memory apparatus and a corresponding one of the receivers in unison so as to couple pairs thereof together via the bus and thereby to transmit data from each memory apparatus to a receiver associated with a destination line, the enabling occurring at rates relating to the various data rates, the transmission occurring at the predetermined data rates.

6 Claims, 2 Drawing Sheets

MODULAR COMMUNICATION SYSTEM WITH ALLOCATABLE BANDWIDTH

FIELD OF THE INVENTION

This invention relates to communication systems, and particularly to switching systems which may be used to switch digitized voice and data.

BACKGROUND TO THE INVENTION

Switching systems have traditionally used localized apparatus to switch voice or data from one line to the other. Such systems utilize space division switching, time division switching or combinations of the two.

In such systems there are often low data rate and capacity lines connected to the switching system as well as high data rate and capacity trunks, the switching system multiplexing the signals from the low data rate lines to the high data rate trunks. Such systems require synchronous operation of the system with the high data rate trunks and must be designed to accommodate the highest capacity and highest data rate to be expected.

Distributed systems have been proposed which accommodate different data rates. One such system is described in U.S. Pat. No. 4,679,191 issued July 7, 1987, assigned to CXC Corporation. In this system a synchronous time division multiplexed ring or loop is used in which messages are passed along the loop from various nodes. Each node receives digitized voice, or data signals sent at various different data rates.

In that system, data at each node is packetized and is transmitted around the loop, which operates as a LAN. While a loop system is described, it is clear that the LAN need not be in that configuration. Each node receives the incoming signal stream, buffers and packetizes it, and transmits it along the LAN to be received at another node. In the system described, one or another token ring protocol is used.

Each node must be synchronized to the ring and to the other nodes, and must contain both transmit and receive circuitry which is designed to transmit and receive packets at the LAN frequency. Each node receiver retransmits every signal not destined for itself. Therefore if the frequency of the LAN is to be increased, e.g. to accommodate higher data rate signals, every node connected to the LAN must be modified to handle the increased bandwidth. This imposes a significant cost penalty on those nodes which are connected to external apparatus which lower data rate data.

In addition, in the described architecture, since each node receives and repeats the ring data, each node contributes jitter to the signal passing along the LAN. Even inactive devices add to this jitter. Therefore the number of devices on the LAN is limited by the tolerance of the LAN to the jitter.

Further, high bit rate services require special jitter handling. For example, the FDDI LAN ring, which operates at 125 MHz has special jitter handling protocols.

The described CXC system clearly has significant limitations and is very costly.

SUMMARY OF THE PRESENT INVENTION

In the present invention different bit rate nodes are accommodated. The lower bit rate nodes need not be designed to the bit rate capacity of the highest bit rate node. Further, if nodes are added for carrying a signal at a higher bit rate than the system was previously designed to accommodate, none of the other nodes need be modified. Indeed, none of the other nodes need be aware of the highest or any other bus data rate (speed). Therefore new high speed services do not force the redesign and replacement of existing nodes. This provides a significant cost advantage to the system as it grows to accommodate additional transmission lines and services.

In the present invention the nodes need only be designed to handle data at their own data rates. Thus low data rate node transceivers, for example, can be less costly than higher data rate transceivers. In the aforenoted CXC prior art design, all node devices have to be designed to handle the highest LAN data rate, and thus low data rate devices have increased costs to accommodate the requirements of the higher data rate devices.

In the present invention there is no repetition of the data travelling around the ring by each node. Therefore there is no jitter contribution from the devices other than the transmitting and receiving transceivers. Inactive devices do not affect the operation of the bus. Indeed, devices as slow as alarms, having very low bit rates, e.g. a few bits per second can be switched along the same bus (LAN) as that which carries high bit rate signals, e.g. 200 Mbits per second. No jitter is contributed to a signal by other nodes, since they do not repeat the signal. Due to the lower jitter, the present invention can handle higher bit rate signals than the system described in the aforenoted patent.

Because the low bit rate transceivers, e.g. those which transmit alarm signals, need only be designed to transmit a few bits per second and need not be designed to accommodate high bit per second signals, the overall cost of the system is substantially less than that of the aforenoted prior art circuit.

In contrast to the circuit described in the prior art patent, in another embodiment of the present invention it can be used as a time switching unit.

The present invention thus can be expanded as the needs of the user warrants. A basic system can be installed, and as additional needs arise such as high capacity computer data switching links, voice circuits, alarm circuits, etc., the system can be expanded in either a local or a distributed manner without requiring modification of the various nodes in the system to accommodate the increased capacity and diverse data rates. The result is a more versatile and less expensive system which can grow to meet the needs of a large variety of users with maximum flexibility and minimum cost.

An embodiment of the invention is a digital communication system comprised of a plurality of lines some of which carry data at various data rates, apparatus for detecting the rates of the data and for determining the destination lines to which the data are to be passed, receivers associated with the lines, memory apparatus for receiving and temporarily storing the data as it arrives on each of the lines carrying data, an internal bus operating at a predetermined data rate at least as high as a maximum one of the various data rates, apparatus for enabling each memory apparatus and a corresponding one of the receivers in unison so as to couple pairs thereof together via the bus and thereby to transmit data from each memory apparatus to a receiver associated with a destination, the enabling occurring at rates relating to the various data rates, and the transmission occurring at said predetermined data rate.

BRIEF INTRODUCTION TO THE DRAWINGS

A better understanding of the invention will be obtained by reference to the detailed description below, in conjunction with the following drawings, in which:

FIG. 1 is a block diagram of the basic configuration of an embodiment of the present invention, FIG. 2 is a block diagram of the detail of each module used in the present invention, and FIG. 3 is an illustration of how the signals are interleaved in accordance with an embodiment of the present invention.

DETAILED DESCRIPTION OF THE INVENTION

Figure 1:
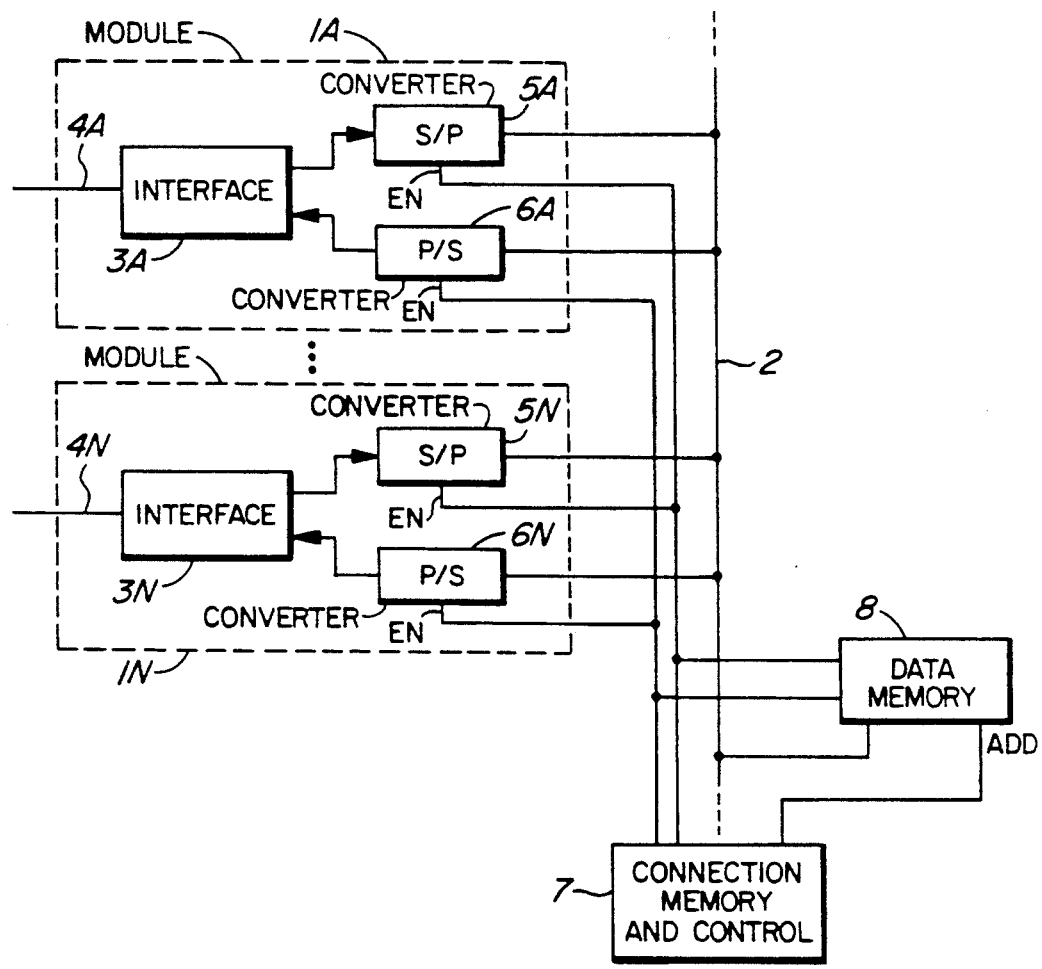

FIG. 1 illustrates modules 1A ... 1N connected to a bus 2. Each module is comprised of an interface 3A ... 3N for interfacing to an external line 4A ... 4N, for receiving serial data, and a transceiver comprised of a serial to parallel converter 5A ... 5N and a parallel to serial converter 6A ... 6N.

A connection memory and control 7 is connected to enable inputs of converters 5A-5N and 6A-6N, the buses connected to the enable inputs of the serial to parallel converters being connected together and to an enable bus of control 7 and the enable inputs of the parallel to serial converters 6A-6N being connected together and to an enable bus of control 7.

Data memory 8 illustrated in FIG. 1 is not used in this embodiment.

Figure 2:
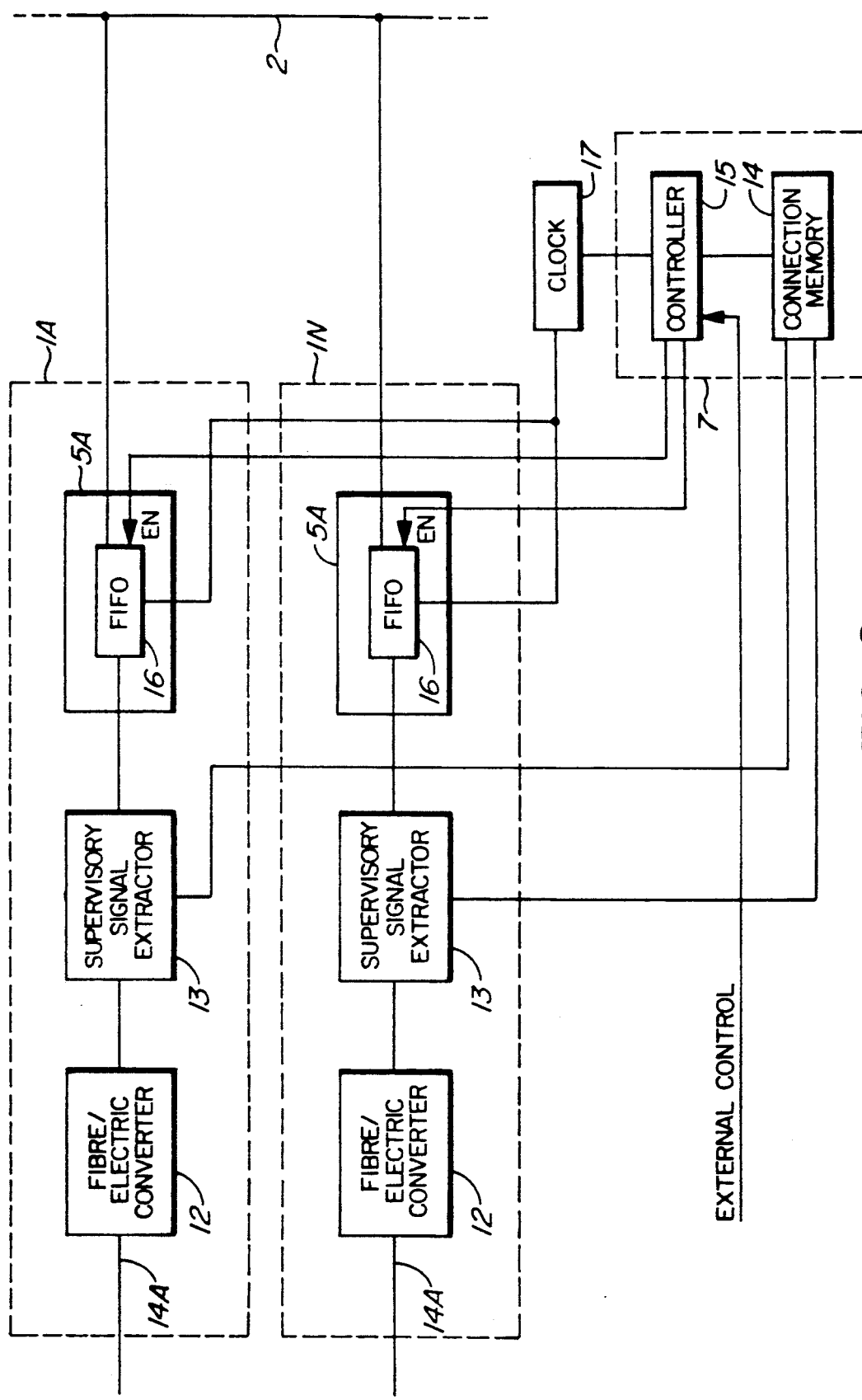

Before describing operation of this embodiment, reference is made to FIG. 2, which illustrates the invention in more detail. A module e.g. 1A is comprised of a transceiver 12. If the external line 4A is, for example, an optical fiber, transceiver 12 is an optical fiber signal to electronic signal converter, which applies the signal received from the optical fiber to its output. A supervisory signal extractor 13 receives the output signal from transceiver 12 and detects and applies the supervisory data from the output signal to a connection memory 14 within connection memory and control unit 7. The supervisory signal extractor 13 can be a register which copies the data in the control bytes, known to be a certain number of bits from the head of a packet, to the connection memory 14, and can be simply an address of a destination line for the received data. This signal is passed to controller 15.

The signal output from transceiver 12 is also passed into a FIFO memory 16, which is clocked from controller 15 at a data rate corresponding to the input data determined by controller 15 from the data rate of the supervisory data extracted in extractor 13. In this manner the incoming data is passed into FIFO 16 on each incoming line, at its own rate. Thus alarm data from one line at several bits per second is read into its corresponding FIFO at a low data rate. High data rate data, e.g. data received on an optical fiber link is read into its corresponding FIFO at a corresponding high data rate.

FIFO 16 performs a serial to parallel conversion, corresponding to converter 5A. The data from each FIFO is applied at the internal bus 2 rate onto the parallel bus 2. There is a similar converter in each module for receiving parallel data from the bus, converting it to serial, and passing it to an interface for transmission to the outside line. Thus the data is read into each FIFO from corresponding external lines at the necessary external line rates and is transferred at an interval high rate via interval bus 2 to another FIFO, from which it is read out to a corresponding destination external line at the necessary data rate of the destination external line.

In operation, considering also FIG. 1, with a record of the data rate of each incoming signal and a record of the destination address for each signal, a sequence of enable signals are applied from controller 15 of control 7 to pairs of FIFOs, one of each pair being for reading data stored in the enabled FIFO to bus 2 and the other for writing data passed via bus 2 during the enable interval into a destination line FIFO.

Each pair of transmitting and receiving FIFOs is enabled in unison. Therefore the bus 2 is reserved, during the enabling period of a pair of FIFOs, for the signal passed from one to the other of that pair of FIFOs relating to a source line and to a destination line. Once the enabling interval has been completed, another pair of source and destination FIFOs is enabled, and the signal from one FIFO is carried via bus 2 to the destination FIFO for that data. Therefore bus 2 is time shared but the data passed thereon is space switched.

As noted earlier, data is received by the various FIFOs from external lines, and must be transmitted at various bit rates which can be unrelated to each other. There is no need for each external line to be synchronous with the other or to be in sync with a common clock. However the bit rate of bus 2 must be at least as high as the highest expected bit rate of any signal to be received. The pairs of FIFOs which are enabled together are clocked under control of controller by clock 17 at this high bit rate. Since the FIFOs are loaded from external lines at usually lower bit rates than the bus 2 bit rate, and are transmitted via bus 2 at a higher bit rate, the capacity of bus 2 thus can accommodate a substantial number of signals.

Figure 3:
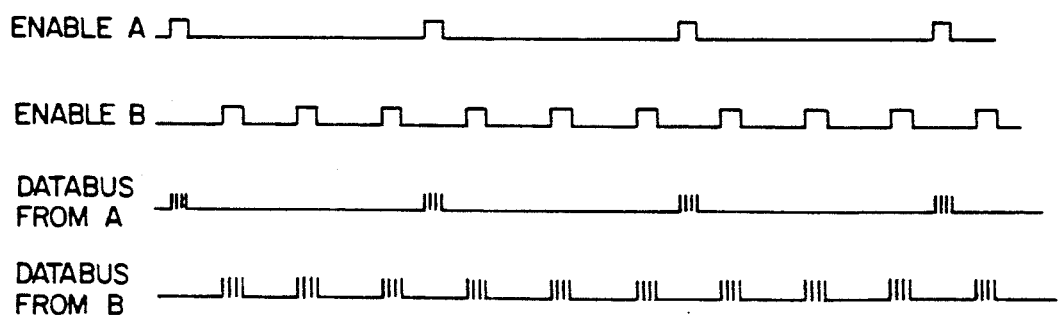

FIG. 3 illustrates the data appearing on the bus. Let us assume that there are two source modules, one being module A, and one being module B, which receive and store data at substantially different rates having clock times which are unrelated to each other. As may be seen the bit rate of the data input to module B is nearly, but not entirely three times the bit rate of module A, as indicated by their FIFO enabling rates.

The FIFO loaded with data by module A is enabled at the rates and intervals shown in the top time line, while the FIFO in module B is enabled at nearly three times that rate as shown in the second from the top time line. The enabling signal is shown as the short pulses on the time lines to the right of the labels Enable A and Enable B.

As a result of the enabling at these intervals by control 7 at rates having been determined from the extracted supervisory data, the data from module A is passed to bus 2, which data is shown as the series of very short pulses shown as spikes immediately following the enabling time in the third time line from the top of FIG. 3. Since a destination FIFO is also enabled at the same time, those pulses are read into its FIFO via bus 2.

After termination of enabling of the FIFO in module A, the FIFO in module B is enabled, causing its data to be passed to bus 2 and thus to the destination FIFO which is enabled at the same time.

While data is passed from module to module at a high bus bit rate, the time lines show the data on the bus 2 received from the two modules being switched between source and destination modules which are related to the external line data rates. Since the system has been space switched, i.e. only a single pair of source and destination FIFOs are enabled at the same time, there is no possibility of the data from one source FIFO being received by an incorrect destination FIFO.

It may be seen that there is no circuitry associated with the bus or with any FIFO which requires synchronous operation by all of the modules associated with the bus, in contrast to the prior art system.

One of the most significant aspects of the present invention will now become evident. Let us assume that an existing system is to be expanded, to accommodate a high data rate optical fiber link, which has, e.g., a data rate twice as high as the highest data rate previously accommodated. In the prior art system, every node (module) would be required to be modified to accommodate the new higher data rate. In the present invention no nodes are modified. The new module is simply connected to the bus and upon recognition of the data rate of the data received from the new module, the controller 15 simply clocks the receiving module FIFO at a reading rate to accommodate the incoming data from its line. However since that FIFO will be filled at a rate which could be higher than the previous bus 2 rate, the clock 17 rate must be raised. This can be done by controller 15, or can be done by substituting a higher data rate clock 17. The result will be clocking of all data from and into all FIFOs via bus 2 at the new higher data rate which is high enough to accommodate the data rate of the highest received signal.

In case the external highest data rate signals are continuous, it is preferred to have clock 17 operate at a rate which will avoid blocking. This clock rate will depend on the data rates of the remaining external signals and the number of external lines, but a data rate of double the highest external signal data rate should suffice in a typical installation.

It may thus be seen that a considerably simplified, less costly and more versatile communication switching system results, which can be expanded to accommodate a large variety of signals having a large variety of data rates at the same time.

The system above can be modified to provide a time switched function. In this embodiment a data memory 8 is provided having an address input connected to the controller 15 of connection memory and control 7, a data bus connected to bus 2, and enable inputs connected to the common enable buses described above.

Now let us assume that data is to be stored and then output back to the source or to another external line. Data memory 8 is considered simply as a destination module. Data from one line, passing through a module, is applied via bus 2 this time to data memory 8, the data being stored at addresses and for an interval controlled by connection memory and control 7. Therefore to time division switch data an incoming data module IA is enabled via an enable line to output data to bus 2 at the same time the data memory 8 is enabled to write the data on bus into storage.

At an appropriate later time, data memory 8 is enabled as a source of data to output stored data onto bus 2 at the same time that a destination module is enabled to receive that data and output it to an output line. The writing and reading addresses for data memory 8 are stored in connection memory and control 7.

Thus in this embodiment, the system described can be used as a space division switch, as a time division switch, or as a combination space and time division switch.

It should be noted that the system can be used in a broadcast or conference function. Data received from an incoming line or from the data memory 8 can be applied to bus 2 at the same time that all of the plurality of destination modules to which the data signals is to be broadcast are enabled to receive the data.

It may thus be seen that the above-described system can be programmed to allocate its bandwidth to each of the interface modules in any proportion, can be configured for broadcasting, conferencing, etc. The content of the connection memory can be changed during every cycle, changing the data interchange connections on a dynamic manner, thus accommodating fast packet switching. Thus while one set of mini-packets is being switched, the destinations of the next set of mini-packets can be written to the connection memory. The connection memory can thus be configured not only by supervisory data received from the input signal, but from another external controller.

A person understanding this invention may now conceive of alternative structures and embodiments or variations of the above. All of those which fall within the scope of the claims appended hereto are considered to be part of the present invention.

I claim:

1. A digital communication system comprising:
   (a) a plurality of lines, some of which carry data at various data rates,
   (b) means for detecting the rates and for determining identities of destination lines to which e data re to be passed,
   (c) receivers connected to said destination lines,
   (d) memory means for receiving and temporarily storing said data as it arrives on said lines carrying data,
   (e) an internal bus operating at a predetermined data rate at least as high as a maximum one of said various data rates,
   (f) means for receiving instructions of the identies of said destination liens and said detected rates and enabling each said memory means and a corresponding one of said receivers, designated by an identity of an associated destination line, in unison so as to couple pairs thereof together via said bus and thereby to transmit data from each memory means to a receiver associated with a destination line, said enabling occurring at rates relating to the various detected data rates, said transmission occurring at said predetermine data rate, each said memory being comprised of a FIFO memory and further including a clock operation at said predetermined data rate for causing readout of said FIFOs to the internal bus at said predetermined rate, said enabling being effected a synchronously.

2. A digital communication system comprisign:
   (a) plural source FIFOs for receiving and storing data at various data rates,
   (b) plural destination FIFOs for receiving and storing data and for transmitting it at various data rates,
   (c) means for enabling pairs of said FIFOs in unison, one of each pair being a source FIFO and one of each pair being a destination FIFO, an mans for clocking said source FIFOs of a pair to write its stored data to a bus during said enabling and for simultaneously clocking said destination FIFO of said pair to receive data on the bus during said enabling, (d) means of determining the data rates of data received for stage in said source FIFOs and for providing indications of said determined data rates to said enabling means for said enabling of said FIFOs at rates related to said determined data rates and the capacities of said source FIFOs, said clocking means being comprised of a clock for providing a clock ate which is at least twice as high as the highest data rate of said data received for storage.

3. A system as defined in claim 2 in which said determining means is comprised of a supervisory signal extractor and a controller for determining a destination address for a data signal carrying said supervisory signal.

4. A system as defined in claim 2 further including means for transferring data from external lines to said source FIFOs and means for transferring data from said destination FIFOs to the same or other external lines.

5. A digital communication system comprising:
  (a) plurally source FIFOs for receiving and storing data t various data rates,
  (b) plurally destination FIFOs for receiving and storing data and for transmitting it at various data rates,
  (c) a data memory,
  (d) a data bus connected to the outputs of said source FIFOs, to the inputs of said destination FIFOs and to said memory,
  (e) means for first enabling a source FIFO and the data memory in unison for passing data from the source FIFO into the data memory via said bus during the first enabling,
  (f) means for latter enabling a destination FIFO and the data memory in unison for passing data from the data memory into the destination FIFO via said bus during the later enabling,
  (g) means for enabling a source FIFO and a destination FIFO in unison at a different time than said first and later enabling for passing data from the latter source FIFO into the latter destination FIFO via said bus, and wherein
  (h) said enabling means enables said FIFOs and data memory at intervals and for periods related to the data rate of source data and the storage capacities of said FIFOs and means for passing said data is comprises of clocking means for clocking said FIFOs and data memory at a bus rate which is at least twice as high as the highest data rate of said source data.

6. A system as defined in claim 5 further including means for transferring data from external lines to said source FIFOs and mans for transferring data from said destination FIFOs to the same or other external lines.

* * * * *